United States Patent
Rozas

(10) Patent No.: US 9,558,116 B2
(45) Date of Patent: *Jan. 31, 2017

(54) COHERENCE DE-COUPLING BUFFER

(71) Applicant: Intellectual Ventures Holding 81 LLC, Las Vegas, NV (US)

(72) Inventor: Guillermo J. Rozas, Los Gatos, CA (US)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/295,062

(22) Filed: Jun. 3, 2014

(65) Prior Publication Data

US 2014/0289471 A1 Sep. 25, 2014

Related U.S. Application Data

(63) Continuation of application No. 11/102,171, filed on Apr. 7, 2005, now Pat. No. 8,751,753, which is a continuation-in-part of application No. 10/411,168, filed on Apr. 9, 2003, now Pat. No. 7,636,815.

(51) Int. Cl.
*G06F 12/00* (2006.01)
*G06F 12/08* (2016.01)
*G06F 12/12* (2016.01)

(52) U.S. Cl.
CPC ....... *G06F 12/0808* (2013.01); *G06F 12/0815* (2013.01); *G06F 12/0831* (2013.01); *G06F 12/128* (2013.01); *G06F 12/0817* (2013.01); *G06F 12/0822* (2013.01)

(58) Field of Classification Search
CPC .. G06F 12/128; G06F 12/0817; G06F 12/082; G06F 12/822; G06F 12/808; G06F 12/0815; G06F 12/0831
See application file for complete search history.

(56) References Cited

U.S. PATENT DOCUMENTS

| | | |
|---|---|---|
| 5,257,354 A | 10/1993 | Comfort et al. |
| 5,317,718 A | 5/1994 | Jouppi |
| 5,345,576 A | 9/1994 | Lee et al. |
| 5,394,555 A | 2/1995 | Hunter et al. |
| 5,412,787 A | 5/1995 | Forsyth et al. |
| 5,524,212 A | 6/1996 | Somani et al. |
| 5,537,574 A | 7/1996 | Elko et al. |
| 5,623,633 A | 4/1997 | Zeller et al. |
| 5,644,753 A | 7/1997 | Ebrahim et al. |
| 5,659,709 A | 8/1997 | Quach |
| 5,704,058 A | 12/1997 | Derrick et al. |

(Continued)

OTHER PUBLICATIONS

Agarwal et al., "The MIT Alewife Machine," Proceedings of the IEEE, vol. 87, No. 3, Mar. 1999, pp. 430-444.

(Continued)

*Primary Examiner* — David X Yi
*Assistant Examiner* — Alan Otto

(57) ABSTRACT

A coherence decoupling buffer. In accordance with a first embodiment, a coherence decoupling buffer is for storing tag information of cache lines evicted from a plurality of cache memories. A coherence decoupling buffer may be free of value information of the plurality of cache memories. A coherence decoupling buffer may also be combined with a coherence memory.

20 Claims, 3 Drawing Sheets

(56) References Cited

U.S. PATENT DOCUMENTS

| | | | |
|---|---|---|---|
| 5,751,995 A | 5/1998 | Sarangdhar | |
| 5,761,468 A | 6/1998 | Emberson | |
| 5,860,111 A | 1/1999 | Martinez, Jr. et al. | |
| 5,897,656 A | 4/1999 | Vogt et al. | |
| 5,953,538 A | 9/1999 | Duncan et al. | |
| 5,987,571 A | 11/1999 | Shibata et al. | |
| 6,088,769 A | 7/2000 | Luick et al. | |
| 6,088,771 A | 7/2000 | Steely, Jr. et al. | |
| 6,122,714 A | 9/2000 | VanDoren et al. | |
| 6,128,701 A | 10/2000 | Malcolm et al. | |
| 6,128,702 A | 10/2000 | Saulsbury et al. | |
| 6,164,841 A | 12/2000 | Mattson, Jr. et al. | |
| 6,167,492 A | 12/2000 | Keller et al. | |
| 6,199,152 B1 | 3/2001 | Kelly et al. | |
| 6,205,517 B1 | 3/2001 | Sugaya | |
| 6,219,745 B1 | 4/2001 | Strongin et al. | |
| 6,249,846 B1 | 6/2001 | Van Doren et al. | |
| 6,345,320 B1 | 2/2002 | Kawamata et al. | |
| 6,430,657 B1 | 8/2002 | Mittal et al. | |
| 6,438,653 B1 | 8/2002 | Akashi et al. | |
| 6,446,187 B1 | 9/2002 | Riedlinger et al. | |
| 6,535,960 B1 | 3/2003 | Nishida et al. | |
| 6,546,464 B2 | 4/2003 | Fortuna et al. | |
| 6,594,821 B1 | 7/2003 | Banning et al. | |
| 6,633,958 B1 | 10/2003 | Passint et al. | |
| 6,638,653 B2 | 10/2003 | Andou et al. | |
| 6,662,277 B2 | 12/2003 | Gaither | |
| 6,668,287 B1 | 12/2003 | Boyle et al. | |
| 6,691,306 B1 | 2/2004 | Cohen et al. | |
| 6,751,706 B2 | 6/2004 | Chauvel et al. | |
| 6,785,780 B1 | 8/2004 | Klein et al. | |
| 6,868,481 B1 | 3/2005 | Gaither et al. | |
| 6,925,536 B2* | 8/2005 | Glasco et al. | 711/141 |
| 2001/0010068 A1 | 7/2001 | Michael et al. | |
| 2002/0087778 A1 | 7/2002 | Schoinas | |
| 2003/0005234 A1 | 1/2003 | Sperber et al. | |
| 2003/0005237 A1 | 1/2003 | Dhong et al. | |
| 2003/0131202 A1 | 7/2003 | Khare et al. | |
| 2003/0163745 A1 | 8/2003 | Kardach | |
| 2006/0123172 A1 | 6/2006 | Herrell et al. | |
| 2006/0224829 A1* | 10/2006 | Evrard | G06F 12/0897 711/133 |

OTHER PUBLICATIONS

Handy, Jim, "The Cache Memory Book," Academic Press, 2nd Edition, Jan. 1998, pp. 155-169.
Agarwal et al., "The MIT Alewife Machine," MIT, Jan. 1995, the whole document.
Non Final Office Action, Mail Date Apr. 7, 2008; U.S. Appl. No. 11/439,361.
Notice of Allowance, Mail Date Aug. 26, 2008; U.S. Appl. No. 11/439,361.
Notice of Allowance, Mail Date Dec. 12, 2008; U.S. Appl. No. 11/439,361.
Restriction Requirement, Mail Date Feb. 21, 2008; U.S. Appl. No. 11/439,361.
Final Rejection, Mail Date Feb. 25, 2009; U.S. Appl. No. 11/102,289.
Final Rejection, Mail Date Sep. 28, 2007; U.S. Appl. No. 11/102,289.
Non Final Office Action, Mail Date Mar. 23, 2007; U.S. Appl. No. 11/102,289.
Non Final Office Action, Mail Date Jun. 12, 2008; U.S. Appl. No. 11/102,289.
Notice of Allowance Dated Jun. 26, 2009; U.S. Appl. No. 11/439,361.
Notice of Allowance Dated Mar. 12, 2009; U.S. Appl. No. 11/439,361.
Non Final Office Action, Mail Date May 12, 2009; U.S. Appl. No. 11/102,289.
Notice of Allowance Dated Mar. 19, 2009; U.S. Appl. No. 10/411,168.
Notice of Allowance Dated Apr. 12, 2007; U.S. Appl. No. 10/411,168.
Notice of Allowance Dated May 23, 2008; U.S. Appl. No. 10/411,168.
Notice of Allowance Dated Oct. 30, 2008; U.S. Appl. No. 10/411,168.
Non Final Office Action, Mail Date Nov. 1, 2007; U.S. Appl. No. 10/411,168.
Non Final Office Action, Mail Date Jul. 27, 2006; U.S. Appl. No. 10/411,168.
Non Final Office Action, Mail Date Sep. 20, 2005; U.S. Appl. No. 10/411,168.
Restriction Requirement, Mail Date Mar. 28, 2006; U.S. Appl. No. 10/411,168.
Non Final Office Action, Mail Date Jul. 29, 2010; U.S. Appl. No. 12/624,094.
Non Final Office Action, Mail Date Jun. 23, 2010; U.S. Appl. No. 11/102,538.
Non-Final Office Action, Mail Date Aug. 24, 2009; U.S. Appl. No. 11/102,538.
Final Office Action, Mail Date Mar. 23, 2009; U.S. Appl. No. 11/102,538.
Non-Final Office Action, Mail Date Dec. 22, 2008; U.S. Appl. No. 11/102,538.
Final Office Action, Mail Date Jun. 12, 2008; U.S. Appl. No. 11/102,538.
Non-Final Office Action ,Mail Date Dec. 12, 2007; U.S. Appl. No. 11/102,538.
Final Office Action, Mail Date Sep. 11, 2007; U.S. Appl. No. 11/102,538.
Non-Final Office Action, Mail Date Mar. 8, 2007; U.S. Appl. No. 11/102,538.
Agarwal et al., "An Evaluation of Directory Schemes for Cache Coherence," ISCA, May 30-Jun. 2, 1988, pp. 280-289.
Final Office Action, Mail Date Jan. 27, 2010; U.S. Appl. No. 11/102,289.
Advisory Action, Mail Date Jun. 11, 2009; U.S. Appl. No. 11/102,538.
Notice of Allowance, Mail Date Aug. 6, 2009; U.S. Appl. No. 10/411,168.
CPU Cache, From Wikipedia, the free encyclopedia Http: //en.wikipedia.org/wiki/CPU, Jan. 1, 2009, pp. 1-18.
Jouppi, Norman P., "Improving Direct-Mapped Cache Performance by the Addition of a Small Full Associative Cache and Prefetch Buffers", Proceedings of the 17th Annual International Symposium on Computer Architecture, pp. 364-373.
Handy, Jim; "The Cache Memory Books", 1998, Academic Press, 2nd Edition, pp. 89-94.
Final Office Action, Mail Date Feb. 12, 2010; U.S. Appl. No. 11/102,538.

* cited by examiner

COHERENCE DE-COUPLING BUFFER

CROSS-REFERENCE TO RELATED APPLICATIONS

This application is a Continuation of and claims priority to U.S. patent application Ser. No. 11/102,171, filed on Apr. 7, 2005, which is a Continuation-In-Part of and claims priority to U.S. patent application Ser. No. 10/411,168, filed on Apr. 9, 2003, and now issued as U.S. Pat. No. 7,636,815, which are hereby incorporated by reference in their entirety.

This application is related to U.S. patent application Ser. No. 11/102,289, filed on Apr. 7, 2005, which is hereby incorporated by reference in its entirety.

FIELD

Embodiments relate to cache coherency in multi-processor computer systems.

BACKGROUND

Shared-memory computer systems comprising multiple caching agents, e.g., processors, typically employ cache coherence protocols in order to implement a memory consistency model such as sequential consistency or total store ordering consistency. Such protocols typically involve "snooping" the caches of other agents, e.g., other processors, prior to a given processor changing the state of one of its own cache lines. This "snooping," also known as coherence traffic, can be quite onerous for a multi-agent system and impose deleterious loading on cache memory bandwidth among agents of such a multi-agent system.

SUMMARY

Conventional cache coherency protocols operating on conventional computer systems are frequently wasteful in that typically there is little or no conflicting, e.g., mutually exclusive, sharing of data. Consequently, most cache "snoops" do not result in a requirement to change cache lines. Typically even when there is sharing of data among several agents, that sharing is read-only in nature and does not require modification of cache lines. Therefore, systems and methods of coherence decoupling buffers for multi-agent computer systems are highly desired.

Accordingly, a coherence decoupling buffer is disclosed. In accordance with a first embodiment, a coherence decoupling buffer is for storing tag information of cache lines evicted from a plurality of cache memories. A coherence decoupling buffer may be free of value information of the plurality of cache memories.

In accordance with another embodiment, a coherence decoupling buffer does not contain value information of the plurality of cache memories.

In accordance with still another embodiment, a computer system comprises a main memory and a plurality of cache memories. The cache memories comprise a plurality of cache lines and each cache line comprises a tag and corresponding value information. A coherence decoupling buffer is coupled to the main memory and to the plurality of cache memories. The coherence decoupling buffer comprises a plurality of tags of cache lines evicted from the plurality of cache memories.

In accordance with still another embodiment, a method of managing coherence among caches is disclosed. It is determined if a tag of a snooped cache line is present in a coherence decoupling buffer. Access to the cache line is granted responsive to a presence of the tag In accordance with still yet another embodiment, a computer system comprises a main memory and a plurality of cache memories. The cache memories comprise a plurality of cache lines and each cache line comprises a tag and corresponding value information. The computer system additionally comprises a coherence memory coupled to the main memory comprising a plurality of tags corresponding to the plurality of cache lines. Further, the computer system comprises a coherence decoupling buffer coupled to the coherence memory and to the plurality of cache memories wherein the coherence decoupling buffer comprises a plurality of tags of cache lines evicted from the plurality of cache memories.

BRIEF DESCRIPTION OF THE DRAWINGS

The accompanying drawings, which are incorporated in and form a part of this specification, illustrate embodiments, together with the description, serve to explain the principles of the disclosure.

DETAILED DESCRIPTION

Figure 1:
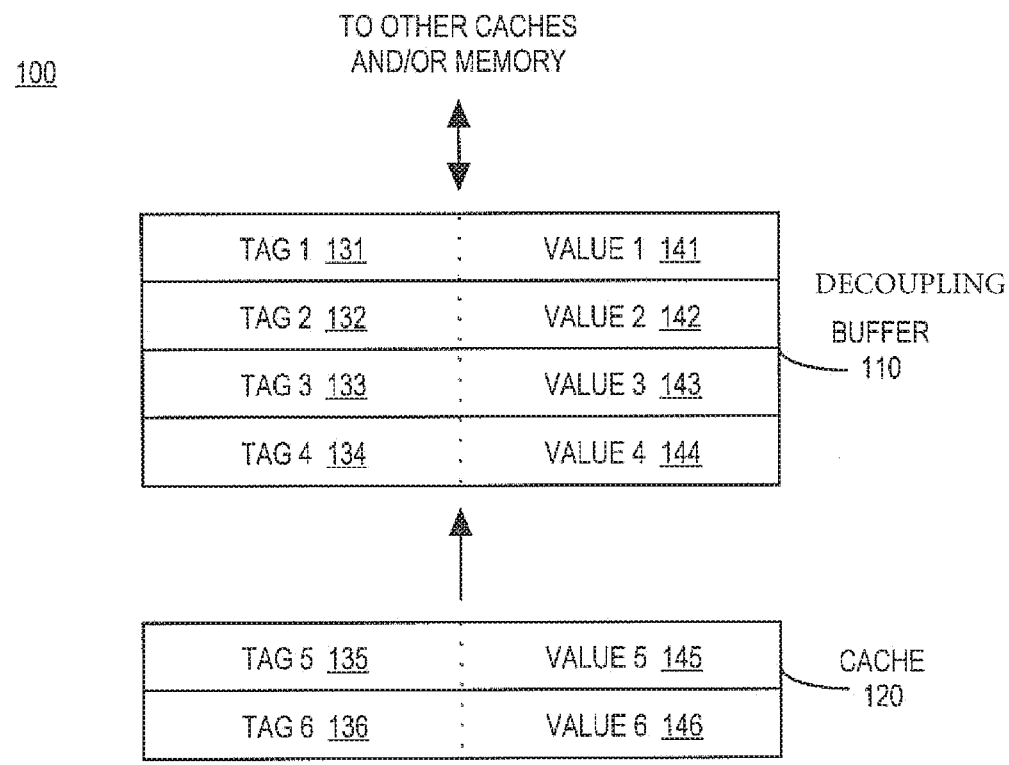
FIG. 1 illustrates a block diagram of an exemplary caching system, in accordance with embodiments.

Reference will now be made in detail to embodiments, examples of which are illustrated in the accompanying drawings. While the disclosure will be described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

Coherence Decoupling Buffer

Embodiments are described in the context of design and operation of integrated semiconductors. More particularly, embodiments relate to a coherence decoupling buffer. It is appreciated, however, that elements of the disclosure may be utilized in other areas of semiconductor design and operation.

The term "cache" is generally understood to refer to or to describe a collection of data or a data structure duplicating values stored elsewhere, for example, duplicating values stored in main memory of a computer system. Once the data are stored in a cache, the data can be used by accessing the copy stored in a cache rather than accessing the original data. Typically, access times to cache memory are much faster than access times to main memory. Consequently, cache accesses are much faster and contribute to increased performance in comparison to accesses to main memory. However, cache memory is typically orders of magnitude more expensive, on a per bit basis, than main memory.

Therefore, complex engineering trade-offs are utilized to determine an advantageous amount of cache memory.

A cache memory is generally organized as a group of cache "lines." A cache line typically comprises a "tag," e.g., of 32 bits, and a "value," e.g., of 1024 bits, for example. The value portion of a cache line typically comprises a copy of information stored (or to be stored) in main memory. The tag portion of a cache line generally identifies a mapping of the cache line value to a portion of main memory. For example, the tag generally comprises the main memory address corresponding to the cache line value. It is appreciated that tags often comprise other information related to the cache line in addition to the address.

Due to the performance advantages of caching, most modern processors, including, e.g., microprocessors, comprise caches, for example, instruction and data caches. Many computer systems also utilize multiple caching agents including multiple cached processors and/or non-processor agents, e.g., caching direct memory access (DMA) agents.

Shared-memory multi-agent computer systems typically employ cache coherence protocols in order to implement a memory consistency model such as sequential consistency or total store ordering consistency.

The term "snoop" is generally understood to refer to or to describe a message from an agent, e.g., a CPU, regarding a status of cache lines.

Conventional cache coherency protocols operating on conventional computer systems are frequently wasteful in that typically there is little or no conflicting, e.g., mutually exclusive, sharing of data. Consequently, most cache snoops do not result in a requirement to change cache lines. Typically even when there is sharing of data among several agents, that sharing is of a read-only nature that does not require changing cache lines. Therefore, systems and methods of coherence decoupling buffers are highly desired.

One such well-known consistency protocol is known or referred to by the initials of its states, MESI. MESI, or Modified, Exclusive, Shared, Invalid, describes a sequence of states and state transitions applied to information in a cache to ensure the integrity of information stored in other CPU caches and main memory. For example, MESI data can be encoded into two bits stored within a cache tag. Such cache status information is sometimes referred to as cache "permissions."

A common condition for data in a cache is to be in the "Shared" state. In the shared state, the cache line contents correspond to main memory and may be shared among all agents.

Prior to being modified by an agent, a cache line is typically marked as being "Exclusive" to a particular cache.

If a CPU (or other agent) modifies information in a cache, the modified lines are marked as "Modified." This indicates that the underlying data, e.g. contained in the main memory, is no longer valid. As other agents learn of this status, e.g., via snooping or inquiry, such agents know not to utilize main memory or their cache copy, if any, corresponding to the modified cache contents.

Responsive to determining that a cache line has been marked modified or exclusive by an agent, other agents typically mark corresponding cache lines as "Invalid," indicating that their copies of an invalid cache line should not be utilized.

State changes among multiple caches can cause the various agents, e.g., CPUs, to perform numerous operations. For example, responsive to a cache line state change, partially complete operation sequences in a CPU may need to be rolled back, cache lines may need to be evicted, CPUs or other agents may need to suspend main operations in order to search their own caches to determine if such caches contain affected cache lines. Such operations to maintain cache coherency are considered a "necessary evil." For example, such operations are conventionally required to maintain cache coherency. However, those same operations are deleterious in that the main operation of an agent, e.g., executing software instructions, does not make progress, and in some cases even regresses, while such cache coherency tasks are completed.

It is appreciated that embodiments are well suited to any hierarchical arrangement of caches within a caching agent. For example, caches internal to a caching agent may be inclusive, exclusive or neither.

It is to be appreciated that embodiments are well suited to other cache coherency models.

A computer system comprising multiple caches that utilizes inclusion, e.g., among multiple levels of cache or via a coherence memory, to filter out cache snoops that do not need to be propagated to the included cache(s) still needs to propagate some snoops.

For example, a remote snoop that results in a cache hit and requires a state change will force a snoop to the included cache(s). For example, a shared access to a cache line that is marked exclusive and dirty, or an exclusive and dirty access to a shared cache line, will force a snoop. It is generally desirable for such snoops to take place in a timely manner as the remote (snooping) agent is waiting for the local agent to perform the required actions, e.g., to invalidate local copies of a cache line.

A second type of required snoop occurs in response to an inclusive cache or coherence memory removing or evicting a cache line, for example because the cache needs space for a newly required line. In contrast to the previous case, however, these snoops can be delayed as no external agent is waiting on them.

In accordance with embodiments, a decoupling buffer is added at a layer "above," e.g., at a hierarchical level higher than, a plurality of included cache(s). Such a decoupling buffer can limit performance degradation due to snoops of this second type, allowing amortization and batching of such snoops.

FIG. 1 illustrates a block diagram of an exemplary caching system 100, in accordance with embodiments. Caching system 100 comprises a cache 120 of well-known design. Cache 120 is inclusive of any other caches (not shown) within system 100. Cache 120 comprises two cache lines (read horizontally in FIG. 1), each cache line comprising tag and value information. For example, tag5 135 comprises identification and status information corresponding to value5 145. The identification information is generally a mapping of the cache line to and address in main memory. The status information generally comprises permission bits and other indicators of allowed usage of the cache line. Cache 120 is illustrated as comprising a second cache line, comprising tag6 136 and value6 146.

Caching system 100 further comprises a coherence decoupling buffer 110, in accordance with embodiments. Coherence decoupling buffer 110 comprises permission information for cache lines that have been evicted from cache 120. It is appreciated that coherence decoupling buffer 110 may optionally comprise additional information related to a cache line, for example, a full tag and/or the value portion of a cache line, in accordance with embodiments.

It is to be appreciated that a coherence decoupling buffer that does not store cache line value information can comprise permission bits for multiple cache lines, thereby making the coherence decoupling buffer effectively larger, e.g., mapping a greater number of evicted cache lines.

Coherence decoupling buffer 110 is illustrated as a first in, first out (FIFO) buffer, although it is to be appreciated that embodiments are well suited to other types of buffers, e.g., a stack or dequeue.

Coherence decoupling buffer 110 is coupled to cache 120. It is to be appreciated that embodiments are well suited to a wide variety of numbers and logical arrangements of caches coupled to coherence decoupling buffer 110. For example, a coherence decoupling buffer is well suited to a caching system in which cache 120 includes, or is inclusive of, multiple caches. Further, a coherence decoupling buffer is well suited to a caching system in which multiple caches are inclusive, exclusive, neither inclusive nor exclusive, or various combinations of such relations.

In response to evicting a cache line from an inclusive cache, e.g., cache 120, the cache line is inserted into coherence decoupling buffer 110. It is appreciated that coherence decoupling buffer 110 is not "inclusive" in a formal caching sense, as coherence decoupling buffer 110 does not contain information currently in cache 120. However, from another perspective, coherence decoupling buffer 110 may be considered inclusive, as it comprises information evicted from an associated inclusive cache.

For example, tag1 131 of coherence decoupling buffer 10 was at one time contained in cache 120. At some point in the past, tag1 131 and its associated value, value1 141, were evicted from cache 120. Similarly, tag2 132, value2 142, tag3 133, value3 143, tag4 134 and value4 144 were all at one time in a cache "below" coherence decoupling buffer 110, e.g., cache 120.

When a remote snoop arrives at the agent comprising coherence decoupling buffer 110, coherence decoupling buffer 110 is examined.

It is appreciated that a remote snoop that hits in the inclusive cache(s) will miss in coherence decoupling buffer 110, as coherence decoupling buffer 110 is filled with cache lines evicted from the inclusive cache. Such a remote snoop hit should be propagated to the inclusive cache(s), e.g., cache 120, in a timely manner. The snoop can either bypass coherence decoupling buffer 110, or it can be inserted in the coherence decoupling buffer 110, subsequently forcing prior pending entries to drain.

A local access that misses in the inclusive cache should look in the coherence decoupling buffer 110. If the access hits within coherence decoupling buffer 110, the entry can be re-inserted into the inclusive cache (assuming that the permissions are compatible) and the entry can be removed from coherence decoupling buffer 110.

It is appreciated that coherence decoupling buffer 110 is well suited to comprising cache line value information. Alternatively, coherence decoupling buffer 110 can be limited to holding only permissions.

Figure 2:
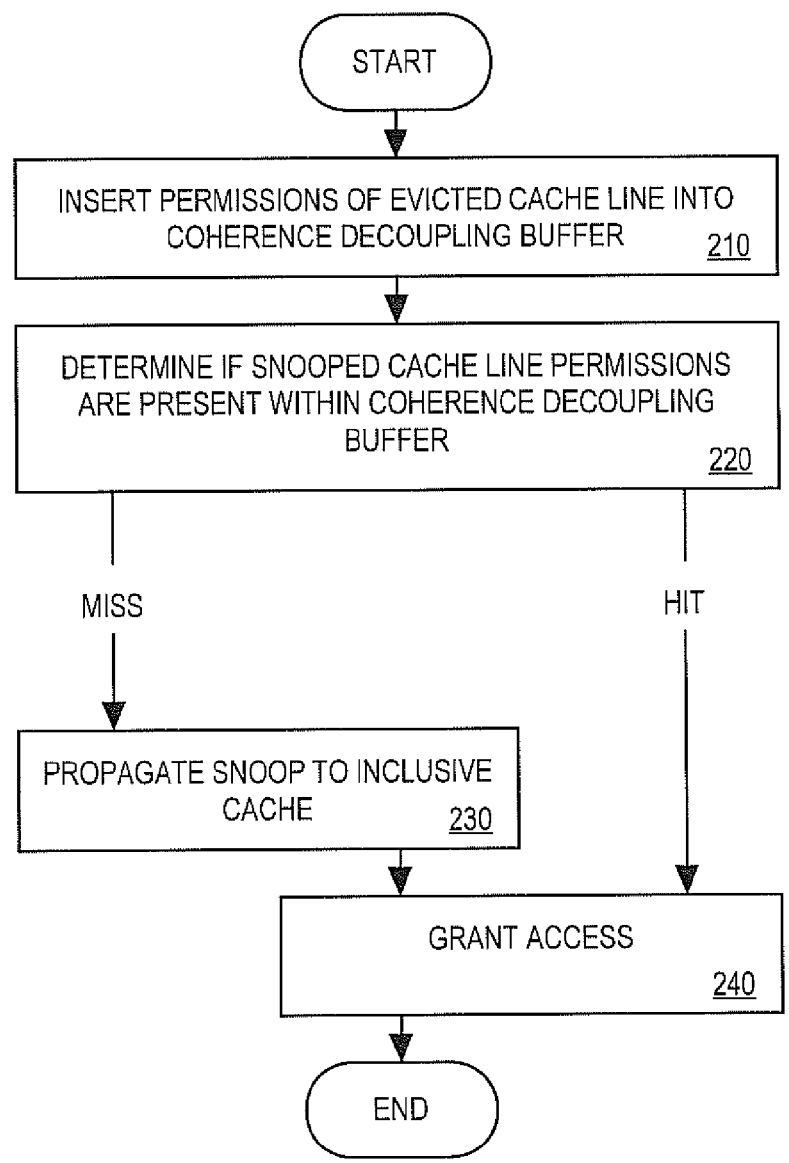
FIG. 2 illustrates an exemplary method of managing coherence among caches, in accordance with embodiments.

FIG. 2 illustrates an exemplary method 200 of managing coherence among caches, in accordance with embodiments. In optional 210, permissions of an evicted cache line are inserted into a coherence decoupling buffer.

In 220, it is determined if permissions of a snooped cache line are present within the coherence decoupling buffer, for example coherence decoupling buffer 110 of FIG. 1. If the permissions of the snooped cache line are not present in the coherence decoupling buffer, the snoop is a miss of the coherence decoupling buffer. It is appreciated, however, that the snoop is not necessarily a miss of the inclusive cache, as the coherence decoupling buffer does not reflect the present contents of the inclusive cache, Consequently, flow of method 200 continues at 230 and the snoop is propagated to the inclusive cache.

If the permissions of the snooped cache line are present in the coherence decoupling buffer, the snoop is a hit of the coherence decoupling buffer. It is appreciated, however, that the snoop is a miss of the inclusive cache, as the coherence decoupling buffer indicates cache lines that are not, e.g., no longer, in the inclusive cache. Consequently, since the cache line is not present in the inclusive cache, the snoop is of no consequence to contents of the inclusive cache and flow of method passes to 240.

In 230, the snoop is propagated to the inclusive cache for processing in accordance with well-known cache coherency protocols. Ultimately, flow passes to 240.

In 240, access to the cache line is granted.

In this novel manner, neither a cache covered by a coherence decoupling buffer nor an associated caching agent are disturbed by cache snoops for recently evicted cache lines. In many cases, this results in increased performance as many snoops are of a read only variety, and do not require cache changes.

In accordance with embodiments, a coherence decoupling buffer can be advantageously combined with a coherence memory. Coherence memory is disclosed in U.S. patent application Ser. No. 11/102,289, filed on Apr. 7, 2005, which is incorporated herein by reference in its entirety.

Figure 3:
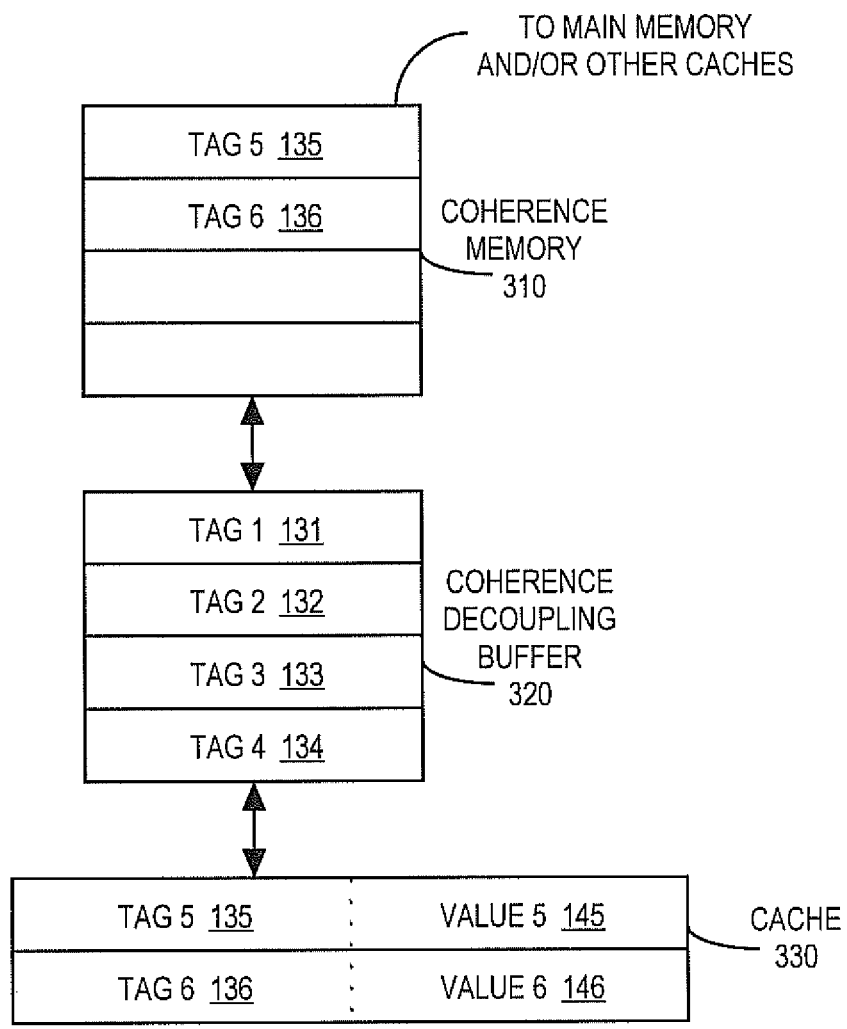
FIG. 3 illustrates a caching system comprising a coherence decoupling buffer and a coherence memory, in accordance with embodiments.

FIG. 3 illustrates a caching system 300 comprising a coherence decoupling buffer and a coherence memory, in accordance with embodiments.

Coherence memory 310 is generally at the top of a caching agent structural hierarchy. Coherence memory is generally coupled to a main memory and other caching agents. Cache 330 is of well-known cache design and operation. Coherence decoupling buffer is coupled between cache 330 and coherence memory 310.

Coherence memory 310 comprises tag information for all included cache(s), e.g., for cache 330. Consequently, coherence memory 310 comprises tag5 135 and tag6 136, corresponding to the contents of cache 330.

As described previously with respect to FIG. 2, coherence decoupling buffer 320 comprises tag information of cache lines that have been evicted from inclusive cache(s), e.g., from cache 330. Coherence decoupling buffer 320 comprises tag1 131, tag2 132, tag3 133, and tag4 134.

In accordance with an embodiment, this novel coupling of a coherence memory with a coherence decoupling buffer can result in advantageously increased cache performance, as read-only snoops to cache lines contained within the included cache(s) are filtered by a coherence memory. Further snoops to an additional set of cache lines that are known not to be within the included cache(s), e.g., have been evicted from such caches, are filtered by a coherence decoupling buffer. Such filtered or blocked snoops do not degrade the main performance of the caching agent, as such snoops generally do in the absence of embodiments of the disclosure.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. An apparatus comprising:
    a local caching agent configured to communicate with a remote source;
    at least one local cache memory configured to store cache line tags and cache line data for the local caching agent;
    a coherence memory configured to store the cache line tags if the cache line tags are stored in the at least one local cache memory; and
    a coherence decoupling buffer coupled to the at least one local cache memory and the coherence memory and configured to store an evicted cache line tag of a cache line evicted from the at least one local cache memory in response to unavailability of space for a new cache line in the at least one local cache memory, wherein the coherence memory and the coherence decoupling buffer are configured to filter communications from the remote source to the local caching agent.

2. The apparatus of claim 1, further comprising a main memory.

3. The apparatus of claim 2, wherein the coherence memory is coupled to the main memory.

4. The apparatus of claim 1, wherein the coherence memory is operable to respond to a remote snoop directed to a cache line of the at least one local cache memory, wherein the local caching agent comprises a processor, and wherein the remote snoop originates from the remote source.

5. The apparatus of claim 1, wherein the coherence decoupling buffer is operable to respond to a remote snoop directed to an evicted cache line of the at least one local cache memory, wherein the local caching agent comprises a processor, and wherein the remote snoop originates from the remote source.

6. The apparatus of claim 1, wherein the coherence memory is at a top of a caching hierarchy.

7. The apparatus of claim 1, wherein the coherence decoupling buffer comprises a capacity that is of substantially less capacity than a total capacity of the at least one local cache memory.

8. An apparatus comprising:
    a local caching agent configured to communicate with a remote source;
    at least one local cache memory configured to store cache line tags and cache line data for the local caching agent;
    a coherence memory configured to store the cache line tags if the cache line tags are stored in the at least one local cache memory and configured to filter a remote snoop from the remote source to the local caching agent; and
    a coherence decoupling buffer coupled to the at least one local cache memory and the coherence memory and configured to store an evicted cache line tag of a cache line evicted from the at least one local cache memory in response to unavailability of space for a new cache line in the at least one local cache memory, wherein if the remote snoop is directed to the cache line evicted from the at least one local cache memory, the coherence decoupling buffer is configured to filter the remote snoop.

9. The apparatus of claim 8, further comprising a main memory.

10. The apparatus of claim 9, wherein the coherence memory is coupled to the main memory.

11. The apparatus of claim 8, wherein the remote snoop comprises a read-only snoop, and wherein the local caching agent comprises a processor.

12. The apparatus of claim 8, wherein the coherence memory and the coherence decoupling buffer increase cache performance.

13. The apparatus of claim 8, wherein the coherence memory is at a top of a caching hierarchy.

14. The apparatus of claim 8, wherein the coherence decoupling buffer comprises a capacity that is of substantially less capacity than a total capacity of the at least one local cache memory.

15. A method comprising:
    filtering a remote snoop from a remote source to a local caching agent by using a coherence memory configured to store cache line tags if the cache line tags are stored in at least one local cache memory for the local caching agent configured to communicate with the remote source; and
    if the remote snoop is directed to a cache line evicted from the at least one local cache memory, filtering the remote snoop by using a coherence decoupling buffer configured to store an evicted cache line tag of the cache line evicted from the at least one local cache memory in response to unavailability of space for a new cache line in the at least one local cache memory.

16. The method of claim 15, wherein the coherence memory is coupled to a main memory.

17. The method of claim 15, wherein the remote snoop is a read-only snoop, and wherein the local caching agent comprises a processor.

18. The method of claim 15, wherein the coherence memory and the coherence decoupling buffer increase cache performance.

19. The method of claim 15, wherein the coherence memory is at a top of a caching hierarchy.

20. The method of claim 15, wherein the coherence decoupling buffer comprises a capacity that is of substantially less capacity than a total capacity of the at least one local cache memory.

* * * * *